United States Patent

Haas, Jr.

[11] 3,942,832
[45] Mar. 9, 1976

[54] LEAF COLLECTOR

[76] Inventor: Donald A. Haas, Jr., 128 Industrial Drive, Summerville, S.C. 29483

[22] Filed: June 27, 1974

[21] Appl. No.: 483,623

[52] U.S. Cl................................ 294/55; 248/101
[51] Int. Cl.². ........................................ A47F 13/08
[58] Field of Search ........ 15/257.1, 257.7; 248/101; 294/1 R, 19 R, 55

[56] References Cited
UNITED STATES PATENTS

| 1,868,269 | 7/1932 | Beadle | 248/101 X |
| 3,606,436 | 9/1971 | Lynch | 294/19 R |
| 3,688,483 | 9/1972 | Hamilton | 294/55 X |
| 3,733,099 | 5/1973 | Szita | 294/19 R |
| 3,804,448 | 4/1974 | Schmieler | 294/55 X |
| 3,841,592 | 10/1974 | Witten | 248/101 |

Primary Examiner—Daniel Blum
Attorney, Agent, or Firm—Bailey & Dority

[57] ABSTRACT

A collector for leaves and the like is illustrated for positioning a bag for collecting leaves and other refuse therein having an open rim for receiving an open end of a bag which is retained thereabout by an elongated elastic restraining member which confines an open end of the bag over the rim in a groove carried by the outer periphery of the rim.

2 Claims, 4 Drawing Figures

LEAF COLLECTOR

BACKGROUND OF THE INVENTION

Means have been provided for positioning plastic bags and the like in a vertical position for receiving garbage and refuse of this type, but such has not been adaptable to the collection of leaves and plant trimmings as associated with gardening. Efforts have been made to providing a rim structure such as illustrated in U.S. Letters Pat. No. 3,697,030 to maintain the open end of the bag in fully open position for the reception of leaves and the like. Such a device, however, must be moved from one pile of leaves to the other and affixed to the ground in each case.

It is an important object of this invention therefor, to provide a collecting device which includes a rim for maintaining plastic bags and the like open, and which may be held in the hand of the user and conveniently placed with a flat edge thereof on the ground thereof adjacent the leaves and the trash to be raked therein.

Another important object of the invention is to provide a collector for positioning a plastic bag and the like in open position wherein a downturned end of the bag may be secured readily about the end of the rim through the use of a elastic band or cable.

BRIEF DESCRIPTION OF THE INVENTION

It has been found that a holder for a plastic bag for collecting leaves and the like may be provided, including an open rim carried by a handle with a peripheral groove in the outer surface of the rim for receiving elastic retaining means confining a downturned edge of the plastic bag within the groove for convenient positioning thereof adjacent piles of refuse to be raked therein.

BRIEF DESCRIPTION OF THE DRAWING

The construction designed to carry out the invention will be hereinafter described, together with other features thereof.

The invention will be more readily understood from a reading of the following specification and by reference to the accompanying drawing forming a part thereof, wherein an example of the invention is shown and wherein.

DESCRIPTION OF A PREFERRED EMBODIMENT

Figure 2:
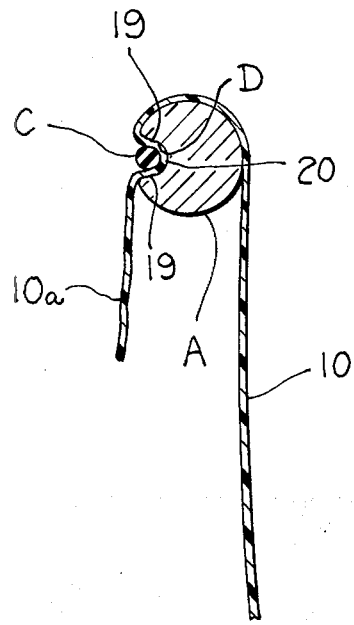
Figure 4:
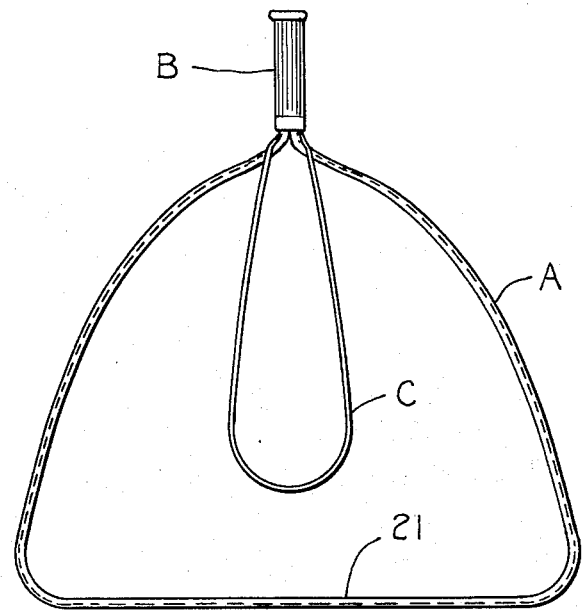
FIG. 4 is a plan view of the holder illustrating the elastic means prior to attachment at bag holding engagement about the rim.

The drawing illustrates a holder for a bag for collecting leaves and the like including an open rim A for receiving an open end of a bag with an open edge portion of the bag passing over and around the rim. A handle B is affixed to the rim as at the ends thereof for carrying the rim. An elongated elastic restraining member C extends about the rim attaching the open end of the bag around the rim. Retaining means D are provided for positioning the elastic restraining member about the rim maintaining the open end of the bag used around the rim.

Figure 1:
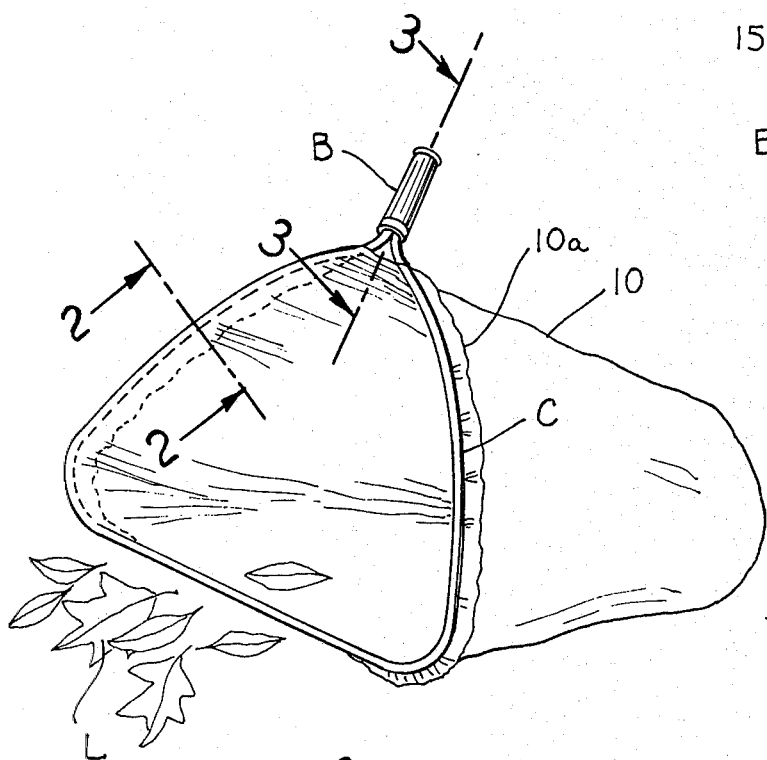
FIG. 1 is a perspective view of a collecting means in the form of a bag holder constructed in accordance with the present invention, illustrated in position for receiving a pile of leaves and the like, FIG. 2 is a sectional elevation taken on the line 2—2 of FIG. 1.
Figure 3:
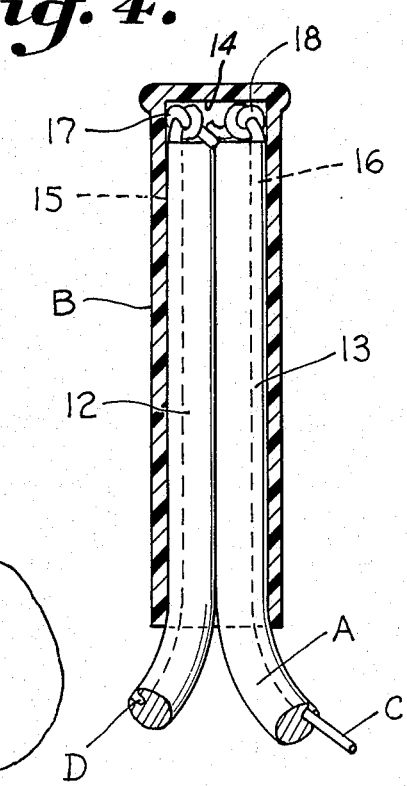
FIG. 3 is a sectional plan view taken on the line 3—3 in FIG. 1.

A plastic leaf bag 10 is illustrated in FIG. 1 in position for collecting leaves or other refuse L from the ground. It will be observed that the rim A is preferably constructed in the form of a loop having straight aligned end portions 12 and 13 for receiving the handle B. The handle B has a recess 14 therein throughout its length receiving the rim end portions 12 and 13 as well as end portions 15 and 16 of the elongated elastic restraining member C. The end portions 15 and 16 are illustrated as being knotted as at 17 and 18, respectively, for retention within the handle B.

The rim A has means D, in the form of an external groove having sides 19 and a base 20, for retaining the elastic restraining member about the rim maintaining the open end of the bag attached around the rim. The bag 10 has an open edge portion 10a passing over and around the rim. The bag is confined within the walls 19 by the elastic restraining member C.

The rim A preferably has a straight side 21 opposite the handle B. This side may be placed on the ground with the bag extending rearwardly therefrom for leaves to be raked or lifted therein.

It is thus observed that a versatile bag positioning device is provided for collecting leaves, plant cuttings and the like. An open end of a plastic bag may be readily positioned and turned over about the rim and securely positioned by simply placing the elastic cable C in position in the groove D about the rim. The device may be carried by hand to any of a number of location points, such as piles of leaves, and the like, and the pile readily placed in the bag.

While a preferred embodiment of the invention has been described using specific terms, such description is for illustrative purposes only, and it is to be understood that changes and variations may be made without departing from the spirit or scope of the following claims.

What is claimed is:

1. A holder for a bag for collecting leaves and the like from the ground comprising:

an open rim for receiving an open end of a bag with an open edge portion of the bag passing over and around the rim;

said open rim having a pair of opposed elongated sides connected by a straight side and terminating in a pair of straight ends extending outwardly from said open rim;

an outwardly extending hollow handle receiving said ends at a juncture thereof extending normally towards said straight side providing exertion of uniform pressure on said straight side of the rim against the ground with the handle in elevated position to present the bag in an open position for the reception of leaves;

an elongated elastic restraining member having a pair of ends permanently secured within said handle forming an extensible loop which may be extended and passed about said rim attaching the open end of the bag around the rim; and groove means on said rim retaining said elastic restraining member about said rim maintaining the open end of the bag attached around the rim;

whereby the open end of the bag may be readily secured about the rim by simply extending the loop thereabout, and the holder may be held in the hand of the user and conveniently placed with the straight side opposite the handle on the ground to facilitate the collection of leaves.

2. The structure set forth in claim 1 wherein said hollow handle has an internal cavity open on one end for receiving said ends of said rim confining said ends of said elastic restraining member within said cavity.

* * * * *